3,475,329
ABSORPTION OF SULFUR DIOXIDE FROM MIXTURES WITH SULFOLANE
Donald M. Little and George R. Hettick, Bartlesville, Okla., assignors to Phillips Petroleum Company, a corporation of Delaware
Filed Mar. 21, 1966, Ser. No. 535,992
Int. Cl. C10g 21/10; C01b 17/56
U.S. Cl. 208—321    3 Claims

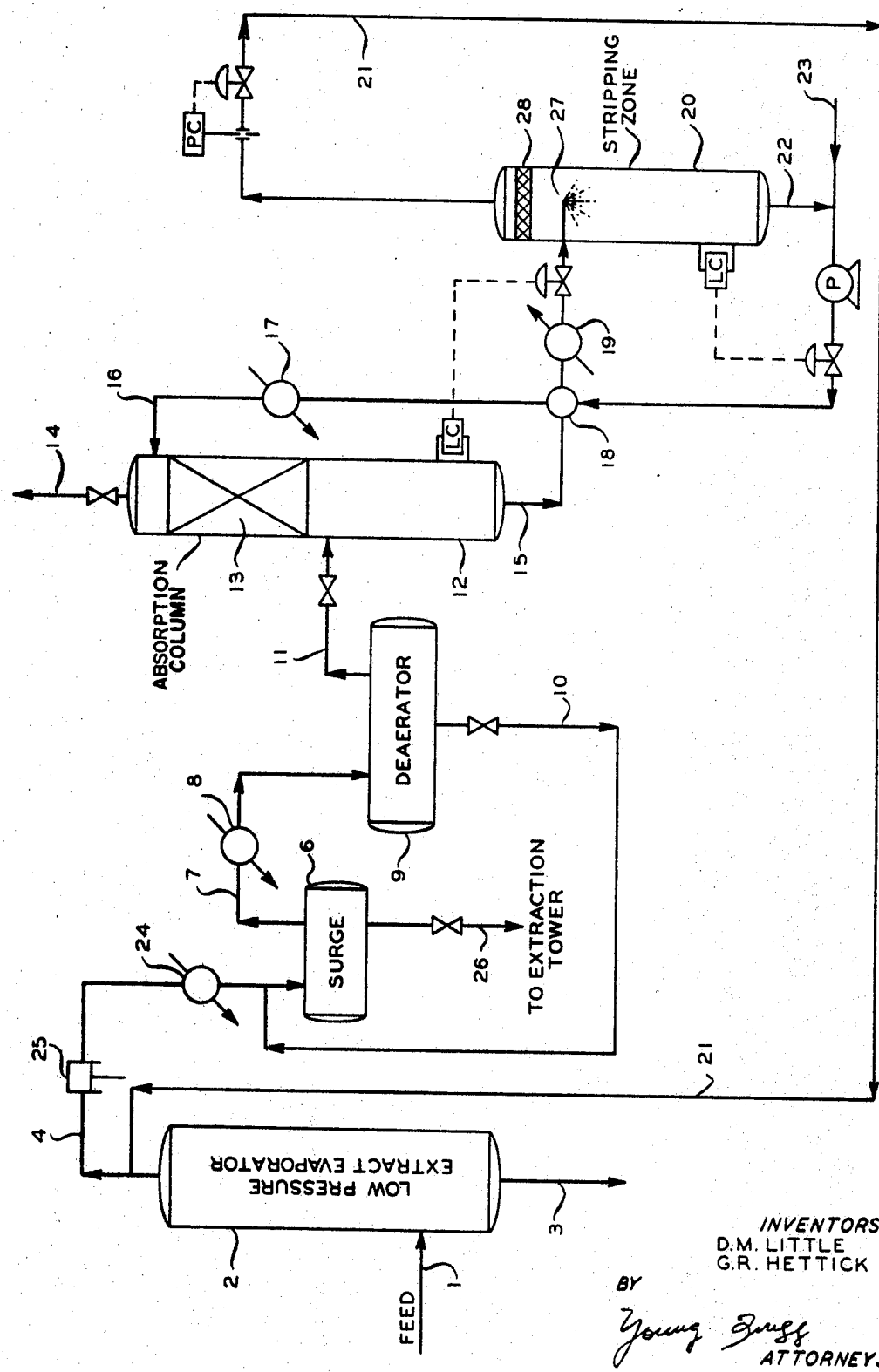

ABSTRACT OF THE DISCLOSURE

Sulfur dioxide is removed from mixtures thereof with relatively non-condensible materials having lower affinity for sulfolane than said sulfur dioxide by contacting such mixtures with sulfolane to selectively absorb sulfur dioxide and subsequently separating the sulfolane-sulfur dioxide solution by selective volatilization.

---

This invention relates to the separation of relatively non-condensible components from mixtures thereof with sulfur dioxide. In one aspect, it provides for a process and apparatus for removing relatively non-condensible materials from mixtures thereof with sulfur dioxide to achieve substantially complete recovery of the sulfur dioxide in a product substantially free of noncondensible components.

In one aspect, this invention relates to a process and apparatus for separating relatively non-condensible vaporous materials from mixtures thereof with sulfur dioxide. In another aspect, it provides for process and apparatus for the purification of sulfur dioxide by extracting mixtures thereof with sulfolane. In yet another aspect, it relates to the sulfolane extraction of mixtures of sulfur dioxide and hydrogen, nitrogen, carbon monoxide and/or low molecular weight hydrocarbons of from 1 to 5 carbon atoms. In yet another aspect, it provides for the countercurrent extraction of mixtures of sulfur dioxide and relatively non-condensible materials with sulfolane and the subsequent separation of the mixture of sulfur dioxide and sulfolane thus produced. In yet another aspect, this invention provides for a process and apparatus for selectively absorbing sulfur dioxide with sulfolane and subsequently separating the mixture produced by flashing the same in a zone of reduced pressure. In yet another aspect, this invention provides for the process and apparatus for contacting at least a part of the overhead product from an extract evaporation zone in a hydrocarbon extraction process with sulfolane in a vapor-liquid absorption zone to selectively absorb sulfur dioxide from mixtures thereof with relatively non-condensible materials and subsequently flashing and separating the sulfolane-sulfur dioxide mixture thus produced.

The process and apparatus of this invention finds particular application to the treatment of at least a part of the sulfur dioxide employed as selective solvent in hydrocarbon extraction processes. The hydrocarbon feed to such processes generally contains small amounts of non-condensible materials such as hydrogen, carbon dioxide, hydrogen sulfide, and low molecular weight hydrocarbons. In addition, where vacuum systems are employed in such hydrocarbon extraction operations it is generally found that appreciable amounts of air leak into the vacuum systems. Due to the nature of the operations these relatively non-condensible materials generally accumulate in the sulfur dioxide recovery systems in both the raffinate and extract phase evaporation zones. Consequently, unless these materials are removed they pose a difficulty in the sulfur dioxide liquefaction steps required to liquefy the recovered sulfur dioxide before its reuse as selective solvent in the hydrocarbon extraction zone.

One method of accomplishing the removal of relatively non-condensible materials from the sulfur dioxide recovery system is through the process of venting a part of the overhead from the sulfur dioxide recovery system. This approach, however, is not desirable in that it results in substantial losses of sulfur dioxide that is unavoidably vented along with the non-condensible materials sought to be eliminated. Another approach to the problem is to vent a part of the overhead from the sulfur dioxide recovery system into a scrubbing zone wherein the vapors are contacted with either extract or raffinate oil which serves to absorb a part of the sulfur dioxide contained in the vent gas. However, due to the selectivity of the oil or sulfur dioxide and the relatively slow rate of mass transfer between vapor and liquid phase in such operations it has been necessary to employ considerable vapor-liquid contact apparatus and excessive volumes of absorbent oil to achieve any substantial degree of sulfur dioxide recovery. Obviously, there is considerable expense involved in such absorption operations as well as in the subsequent separation operations that must be effected in order to accomplish the recovery of sulfur dioxide from the absorbent oil.

We have now found that the removal of relatively non-condensible materials from mixtures thereof with sulfur dioxide can be accomplished without any appreciable loss of sulfur dioxide by extracting the sulfur dioxide from such mixtures with sulfolane and subsequently separating the recovered sulfur dioxide from the sulfolane solution thus produced.

It is, therefore, an object of this invention to provide for a process and apparatus for the removal of relatively non-condensible materials from mixtures thereof with sulfur dioxide. It is another object of this invention to provide for the removal of non-condensible materials from mixtures thereof with sulfur dioxide without any appreciable loss of sulfur dioxide resulting therefrom. It is yet another object of this invention to provide for the removal of relatively non-condensible materials from sulfur dioxide with substantially complete recovery of the sulfur dioxide of sufficient purity to allow its reuse as selective solvent in hydrocarbon extraction processes.

Other aspects, objects and advantages of the process and apparatus of this invention will be obvious to one skilled in the art from the following disclosure and the appended claims.

One embodiment of this invention relates to the purification of sulfur dioxide by contacting mixtures of sulfur dioxide and relatively non-condensible materials with sulfolane to selectively absorb the sulfur dioxide in preference to relatively non-condensible materials having lower affinity for sulfolane to produce a solution of sulfur dioxide and sulfolane substantially free of said non-condensible materials and subsequently separating the sulfur dioxide from the sulfolane by a suitable fractionation process such as flashing, distillation, evaporation, etc.

In accordance with another embodiment of this invention, liquid sulfolane is intimately contacted with a mixture of sulfur dioxide and relatively non-condensible materials in an absorption zone to selectively remove sulfur dioxide from the vapor phase thereby allowing the relatively non-condensible materials, having a lower affinity for sulfolane, to remain in vapor phase and pass from the system with the subsequent treatment of the mixture of sulfolane and sulfur dioxide thus produced in a fractionation zone to produce a sulfur dioxide overhead product containing negligible amounts of non-condensible materials, and reusing the sulfolane bottoms product, having only trace amounts of sulfur dioxide therein, as absorbent in the aforesaid absorption zone.

In another embodiment of this invention, at least a part of the overhead product from either the extract or raffinate evaporation zones in the hydrocarbon extraction process is intimately contacted with liquid sulfolane in an absorption zone at conditions sufficient to achieve the effective removal of sulfur dioxide from the vapor phase feed while allowing the relatively non-condensible materials in the feed, having a lower affinity for sulfolane, to be removed from the system as overhead, and passing the solution of sulfolane and sulfur dioxide thus produced to a flash zone wherein substantially complete separation of sulfolane and sulfur dioxide is effected to allow the recovery of an overhead product comprising primarily sulfur dioxide and having therein only negligible amounts of relatively non-condensible materials, and a sulfolane bottoms product being substantially free of sulfur dioxide, and passing said sulfolane bottoms product as selective absorbent for the removal of sulfur dioxide from the evaporator overhead.

Although the process and apparatus of this invention are particularly adaptable to the purification of sulfur dioxide recovered from the evaporation zones in a hydrocarbon extraction process and that these specific embodiments of this invention are generally related to such operation, it is not intended that this method of illustration should in any way be construed to limit the scope of this invention or its application. On the contrary, it would be obvious to one skilled in the art that the concept of this invention could be applied to the separation of relatively non-condensible materials from mixtures thereof with sulfur dioxide regardless of the origin of such mixtures.

Generally, the mixtures of sulfur dioxide to be treated by the process of this invention can be passed directly in vapor phase to the sulfolane absorption zone of this invention. However, in certain situations it might be desirable to subject the feed mixtures to preliminary processing in order to simplify the subsequent purification steps. For example, mixtures of sulfur dioxide containing water or relatively high molecular weight hydrocarbon compounds can be compressed and/or cooled and separated to provide for the removal of such constituents from the feed to the process of this invention. Similarly, gaseous mixtures containing high concentrations of sulfur dioxide can be compressed and/or chilled and separated to provide for the recovery of at least a part of the sulfur dioxide prior to the passage of the mixed feed to the sulfolane absorption zone. Either or both of these preliminary treatments are particularly adaptable to the treatment of mixtures of sulfur dioxide wherein the feed stream is produced as the overhead product from either the raffinate or extract evaporation zones in a hydrocarbon extraction process wherein sulfur dioxide is employed as selective solvent.

In such hydrocarbon extraction processes it has been found desirable to employ several serial evaporation stages for the purification of both raffinate and extract phases and recovery of sulfur dioxide. In such operations, it is possible to accumulate the major part of the relatively non-compressible materials in this system in the overhead product of one of the several evaporation stages. Such a mode of operation is highly desirable in that the evaporator overhead product containing the relatively concentrated non-condensible materials can be conveniently employed as a feedstock to the process of this invention for the purpose of eliminating the relatively non-condensible materials from the system.

In the drawings, the drawing shows in schematic form the preferred embodiment of this invention in combination with an intermediate evaporation stage in a hydrocarbon extraction process and facilities for recovering at least a part of the sulfur dioxide from the evaporator overhead before its introduction to the sulfolane absorption zone.

Referring now to the drawings, a mixture of extract oil and sulfur dioxide containing small amounts of nitrogen, carbon monoxide, hydrogen, hydrogen sulfide, carbon dioxide, and relatively low molecular weight hydrocarbons is passed by way of pipe 1 to an intermediate extract evaporator 2 wherein a major part of the sulfur dioxide and the more volatile low molecular weight hydrocarbons and relatively non-condensible gases are separated by evaporation and removed as overhead product through pipe 4 and extract hydrocarbon substantially free of non-condensible constituents is removed as bottoms product through pipe 3 for further treatment in a vacuum evaporation zone. The overhead product, along with a subsequently recovered $SO_2$-rich stream 21, is compressed in compressor 25 and chilled in cooler 24 at a pressure of about 95 p.s.i.g. and a temperature of about 100° F. to promote the condensation of sulfur dioxide in the mixed gas stream. (Also introduced into vessel 6 is liquid stream 10 recovered from the subsequent deaerator vessel 9.) The thus condensed sulfur dioxide is collected in a suitable vessel 6, and can be passed either intermittently or continuously by way of pipe 26 to liquid-liquid sulfur dioxide extraction zone (not shown). The vapor phase from vessel 6 is passed by way of pipe 7 to a second chiller 8 and expanded to a pressure of about 55 p.s.i.g and a temperature of 80° F. to concentrate the light gases in the gas phase. The mixture is collected in a suitable deaeration vessel 9 and the liquid $SO_2$, now lean in light gases, is removed by way of pipe 10 and returned to vessel 6, as above-described. The sulfur dioxide thus recovered via conduit 26 can be passed into admixture with the sulfur dioxide feed to the hydrocarbon extraction zone (not shown) or it can be introduced at any other suitable point in the sulfur dioxide recovery system. The vapor phase in vessel 9 containing essentially all of the relatively non-condensible constituents in the recovery system as well as a substantial amount of gaseous sulfur dioxide is removed as overhead by way of pipe 11 and introduced into the bottom of absorption column 12. The absorption column can be provided with any suitable contacting device such as baffle arrangements or Raschig rings as illustrated at 13 to promote intimate contact between concentrated sulfolane introduced by pipe 16 and the upwardly moving feed gases. The column is operated at a pressure of about 50 p.s.i.g. and a top temperature of about 90° F. and a bottom temperature of about 110° F. which conditions result in very efficient removal in the sulfolane of sulfur dioxide from the feed stream. The vapor phase comprising substantially all of the non-condensible constituents in the feed is removed by way of pipe 14 and vented. The bottoms product comprising primarily sulfolane and substantially all of the sulfur dioxide in the feed is passed by way of pipe 15, heat exchanger 18 and heater 19 to flash column 20. This mixture of sulfolane and sulfur dioxide at a temperature of about 240° F. and a pressure of about 45 p.s.i.g. is flashed to a pressure of about 10 p.s.i.g. through the high pressure drop nozzle 27. This mode of operation provides for highly efficient and rapid separation of sulfur dioxide from sulfolane sufficient to effect the resolution of a liquid phase comprising sulfolane and having dissolved therein only negligible amounts of sulfur dioxide and a vapor phase comprising essentially all of the sulfur dioxide in the feed to the flash column, said vapor phase having a substantially reduced concentration of relatively non-condensible materials as compared to the amounts of such materials present in the overhead from the low pressure extract evaporator 2.

To aid in separation and prevent the carry over of entrained liquid phase with the overhead from the flash column, said column can be provided with a disengaging section 28 as required. The concentrated sulfolane removed as bottoms product by way of pipe 22 can be admixed with makeup sulfolane introduced by way of pipe 23 as desired and passed as recycle by way of heat exchanger 18 and cooler 17 as sulfolane charged to the uper portion of absorber column 12. The purifier sulfur dioxide overhead product removed from the flash column can either be collected or, as any preferred embodiment of this invention, can be recycled by way of line 21 to the sulfur dioxide recovery system in the hydrocarbon extraction process and preferably to the overhead yield of the low pressure extract evaporator 2.

By way of example of the compositions and relative rates of the several process streams involved in this invention, a comparison of the results of one particular operation employing the sulfolane absorption process as above described and the results of a similar absorption process employing extract oil as absorbent is illustrated in Table I. The numbers at the head of each column in Table I correspond to the streams illustrated in the drawing having the same numbers. The numerical values in each column indicate the rate of flow of each constituent in pounds per hour. The decided advantage in use of sulfolane as absorbent is illustrated by the amounts of sulfur dioxide carried over as overhead product through pipe 14 in the process of the present invention as compared to operations employing extract oil as absorbent. It is further apparent from the data in Table I that the process of the present invention is very efficient in accomplishing the substantial removal of the non-condensible constituents from the sulfur dioxide. The effectiveness of this process in substantially minimizing the loss of sulfur dioxide while accomplishing the removal of relatively non-condensible materials from the product stream is further illustrated by a comparison of the rate of sulfur dioxide recovery of 504.1 pounds per hour in column 21 of Table I and the rate of sulfur dioxide feed to the sulfolane absorption zone of 505.8 pounds per hour shown in column 11 of Table I. There are recovered from the vent gases by this invention 147.1 pound $SO_2$ per hours which were lost to the atmosphere using extract oil as the absorbent.

The aforegoing descriptions and examples are intended only to be illustrative of the application of the process of this invention in one particular instance and are not to be construed to limit the scope or application of the concept of this invention. It would be obvious to one skilled in the art that various modifications to the mode of operation above described could be made without effecting a departure from the concept of this invention. For example, the sulfolane absorption zone is not limited in its specific characteristics to the particular embodiment disclosed herein. In essence, all that is required in the absorption operation is that adequate facilities be provided to effect a sufficient degree of contact between the sulfur dioxide feed and the sulfolane absorbent to accomplish an economically feasible degree of sulfur dioxide recovery. As a result, the absorption zone could conceivably comprise a vessel in which a predetermined level of sulfolane is maintained with provisions for passing the sulfur dioxide feed mixture upwardly through the liquid phase. Similarly, the absorption operation might comprise a relatively high pressure extractive distillation operation per se or the combination of such with a quiescent liquid phase absorption step.

Similarly, the sulfolane flash zone described in the aforegoing discussion and illustrated in the drawings is intended only to be illustrative of one manner in which the separation of sulfolane and sulfur dioxide can be accomplished. It would be obvious to one skilled in the art that other modes of fractionation such as distillation or evaporation could be employed to accomplish the separation required.

However, the mode of operation illustrated in the drawings and described in accordance therewith is, for reasons of economics and simplicity, the presently preferred embodiment of this invention.

TABLE I.—USING EXTRACT OIL AS ABSORBENT
[Reported as pounds/hour]

| Stream Component | (11) | (14) | (15) | (16) | (21) |
|---|---|---|---|---|---|
| Hydrogen | Trace | Trace | | | |
| $N_2$ and CO | 5.8 | 5.8 | | | |
| $HS_2$ | 0.2 | 0.2 | | | |
| $CO_2$ | 0.2 | 0.2 | | | |
| $SO_2$ | 170.8 | [1] 148.8 | 22.0 | | |
| $C_1$-$C_5$ hydrocarbons | 13.6 | 11.1 | 2.5 | | |
| Extract oil | | | 9,000.0 | 9,000.0 | |
| Sulfolane | | | | | |
| Total | 190.6 | 166.1 | 9,022.5 | 9,000.0 | Not done |

USING SULFOLANE AS ABSORBENT
[Reported as pounds/hour]

| Stream Component | (11) | (14) | (15) | (16) | (21) |
|---|---|---|---|---|---|
| Hydrogen | Trace | Trace | | | |
| $N_2$ and CO | 5.9 | 5.9 | | | |
| $H_2S$ | 14.6 | 0.2 | 14.4 | | 14.4 |
| $CO_2$ | 28.1 | 0.2 | 27.9 | | 27.9 |
| $SO_2$ | 505.8 | [2] 1.7 | 504.1 | | 504.1 |
| $C_1$-$C_5$ hydrocarbons | 12.1 | 11.0 | 1.1 | | 1.1 |
| Extract oil | | | | | |
| Sulfolane | | | 9,000.0 | 9,000 | |
| Total | [3] 566.5 | 19.0 | 9,547.5 | 9,000 | 547.5 |

[1] 148.8 pounds $SO_2$ vented per hour using extract oil.
[2] 1.7 pounds $SO_2$ vented per hour using sulfolane, with 147.1 pounds $SO_2$ per hour being recovered for return to the system.
[3] Includes recycled recovered $SO_2$.

OPERATING CONDITIONS

| | Range | Specific |
|---|---|---|
| Extraction Zone (12): | | |
| Top Temp., °F | 60 to 200 | 90 |
| Bottom temp., °F | 90 to 225 | 110 |
| Pressure, p.s.i.g | 1 to 200 | 50 |
| Weight ratio: solvent/feed | 2:1 to 20:1 | 16:1 |
| Flash Zone (20): | | |
| Flash zone, °F | 80 to 350 | 220 |
| Pressure, p.s.i.g | 0 to 100 | 10 |

As will be evident to those skilled in the art, various modifications of this invention can be made or followed in the light of the foregoing disclosure and the appended claims without departing from the spirit or scope of this invention, the essence of which is the provision of a method and apparatus for removing sulfur dioxide from a feed mixture thereof with relatively noncondensible materials by contacting the same with sulfolane in a vapor-liquid absorption zone at conditions sufficient to promote the selective absorption of the sulfur dioxide in preference to the relatively non-condensible materials.

We claim:
1. In a liquid-liquid sulfur dioxide-hydrocarbon extraction process, the improvement which comprises:
   (a) cooling at least a part of the overhead product from an extract evaporation zone to condense a portion of the sulfur dioxide contained therein;
   (b) separating and recycling the thus condensed sulfur dioxide to a hydrocarbon extraction zone;
   (c) contacting the uncondensed portion containing sulfur dioxide and substantially all of the more volatile components being relatively non-condensible at the conditions of said extraction process with sulfolane in a vapor-liquid absorption zone to produce an overhead product comprising the relatively non-con- densible components and sulfur dioxide in the vapor feed to said absorption zone, and a bottoms product comprising sulfolane and sulfur dioxide being substantially free of non-condensible components;

(d) flashing said bottoms product to effect substantially complete separation of sulfur dioxide and sulfolane to produce an overhead product and a bottoms product, said overhead product comprising primarily sulfur dioxide and being substantially free of non-condensible components, and said bottoms product comprising primarily sulfolane and being substantially free of sulfur dioxide;

(e) recycling said overhead product to the hydrocarbon extraction zone; and (f) recycling the concentrated sulfolane bottoms product to said absorption zone.

2. In a liquid-liquid sulfur dioxide-hydrocarbon extraction process, the improvement which comprises:

(a) Compressing and cooling at least a part of the overhead from an extract evaporation zone to condense a portion of the sulfur dioxide contained therein;

(b) Separating the thus condensed sulfur dioxide from the remaining vapor in a first liquid-vapor separation zone;

(c) Recycling the thus separated sulfur dioxide to a hydrocarbon extraction zone;

(d) Cooling and expanding at least a part of the overhead product from said first liquid-vapor separation zone to condense a portion of the sulfur dioxide contained therein;

(e) Separating the thus condensed sulfur dioxide from the remaining vapor in a second liquid-vapor separation zone;

(f) Recycling the thus condensed sulfur dioxide to downstream of the cooling in step (a) and upstream of the first liquid-vapor separation zone;

(g) Contacting the vapor from said second liquid-vapor separation zone, containing sulfur dioxide and substantially all of the more volatile components being relatively non-condensible at the conditions of said extraction process, with sulfolane in a vapor-liquid absorption zone to produce an overhead product comprising the relatively non-condensible components in the vapor feed to said absorption zone, and a bottoms product comprising sulfolane and sulfur dioxide being substantially free of non-condensible components;

(h) Flashing said bottoms product into a flash zone to effect substantially complete separation of sulfur dioxide and sulfolane to produce an overhead product and a bottoms product, said overhead product comprising primarily sulfur dioxide and being substantially free of non-condensible components, and said bottoms product comprising primarily sulfolane and being substantially free of sulfur dioxide;

(i) Recycling said overhead product to the overhead from an extract evaporation zone upstream of the compressing in step (a); and (j) Recycling the concentrated sulfolane bottoms product to said absorption zone.

3. The method of claim 2 wherein non-condensible components comprise at least one member of the group consisting of $H_2S$, $CO_2$, $N_2$, CO and light hydrocarbons having 1–5 carbon atoms, wherein the compressing and cooling in step (a) is to about 95 p.s.i.g. and about 100° F., wherein the cooling and expanding in step (d) is to about 55 p.s.i.g. and about 80° F., wherein said pressure, overhead and bottoms temperature in said absorption zone are about 50 p.s.i.g., about 90° F., and about 110° F., respectively, and wherein said bottoms product is heated to a temperature of about 240° F. prior to said flashing and flashed from a pressure of about 45 p.s.i.g. to a pressure of about 10 p.s.i.g. into said flash zone, said flash zone being about 200° F.

References Cited

UNITED STATES PATENTS

| | | | |
|---|---|---|---|
| 2,385,704 | 9/1945 | Hooker et al. | 23—178 |
| 2,777,800 | 1/1957 | Mitchell et al. | 208—321 |
| 2,779,709 | 1/1957 | Dale et al. | 208—321 |
| 2,384,378 | 9/1945 | Hooker et al. | 55—73 XR |
| 2,649,166 | 8/1953 | Porter et al. | |
| 2,805,981 | 9/1957 | Cavin et al. | 203—90 |
| 2,855,433 | 10/1958 | Cobb | 62—17 |
| 2,875,848 | 3/1959 | Cathala | 55—73 |
| 2,905,638 | 9/1959 | Hettick | 208—321 |
| 3,039,251 | 6/1962 | Kamlet | 55—73 |
| 3,161,461 | 12/1964 | Deal et al. | 55—73 |
| 3,165,539 | 1/1965 | Lutz | 203—88 |

WILBUR L. BASCOMB, Jr., Primary Examiner

U.S. Cl. X.R.

23—2, 178; 55—73; 62—17; 203—42, 58, 88, 90; 208—338; 260—676